US006991203B2

(12) United States Patent
Steadman

(10) Patent No.: US 6,991,203 B2
(45) Date of Patent: Jan. 31, 2006

(54) SUPPORT ARRANGEMENT

(75) Inventor: William D. Steadman, Port Saint Lucie, FL (US)

(73) Assignee: William Steadman, Port Saint Lucie, FL (US)

( * ) Notice: Subject to any disclaimer, the term of this patent is extended or adjusted under 35 U.S.C. 154(b) by 0 days.

(21) Appl. No.: 10/866,956

(22) Filed: Jun. 14, 2004

(65) Prior Publication Data

US 2005/0274070 A1 Dec. 15, 2005

(51) Int. Cl.
F16B 1/00 (2006.01)
(52) U.S. Cl. .................. 248/230.8; 47/42; 248/525
(58) Field of Classification Search ............ 248/218.4, 248/219.4, 230.1, 230.8, 230.9, 534, 535, 248/524, 525; 24/298, 302; 47/42, 43, 47
See application file for complete search history.

(56) References Cited

U.S. PATENT DOCUMENTS

| 1,560,404 A |   | 11/1925 | Brown |
|---|---|---|---|
| 1,648,220 A | * | 11/1927 | Gerow et al. ............... 248/541 |
| 2,959,388 A | * | 11/1960 | Fogle ...................... 248/230.9 |
| 3,293,709 A |   | 12/1966 | Holton |
| 3,429,605 A |   | 2/1969 | Soesbergen |
| 4,088,294 A |   | 5/1978 | Aliment et al. |
| D260,960 S |   | 9/1981 | Malia, Jr. |
| 4,848,027 A |   | 7/1989 | Skierwiderski |
| 5,159,780 A |   | 11/1992 | Molthen |
| 5,340,066 A |   | 8/1994 | Ditch |
| 5,465,529 A |   | 11/1995 | Park |
| 5,577,701 A |   | 11/1996 | Pizak |
| 5,590,865 A | * | 1/1997 | Odom, Jr. ................... 248/524 |
| 5,950,359 A |   | 9/1999 | Pivnik |
| 6,142,434 A | * | 11/2000 | Trost et al. ............... 248/218.4 |
| 6,155,529 A |   | 12/2000 | DeCarlo |
| 6,370,817 B1 |   | 4/2002 | Brooks et al. |
| 6,612,071 B1 |   | 9/2003 | Steadman |

FOREIGN PATENT DOCUMENTS

| DE | 3810570 | * | 10/1989 |
|---|---|---|---|
| GB | 2307170 | * | 5/1997 |
| GB | 2 365 309 A |   | 3/2000 |
| JP | 9-191775 | * | 7/1997 |

OTHER PUBLICATIONS

Search Report under Section 17 dated Sep. 15, 2004.

* cited by examiner

Primary Examiner—Ramon O Ramirez
(74) Attorney, Agent, or Firm—Watts Hoffmann Co., L.P.

(57) ABSTRACT

An arrangement for supporting a tree comprising a bracket and a pair of elongate bands each including a plurality of circular openings. The bands being extendable in loops from the bracket around a tree. The bracket has a pair of band receiving openings to receive free ends of the respective bands. A respective mounting opening is provided a short distance from each of the receiving openings. A pair of tangentially extending housings are respectively adjacent each of the openings to receive anchored ends of the respective bands. Inclined projections extend into each housing from an upper wall thereof to retain the band by engagement of the projections through respective retention openings in the bands. Bands can be tightened by location of a tool extending through a retention opening towards the anchored end of the respective band extending from the housing and also through a retention opening in the free end of the band through the respective mounting, such that a lever action can be applied with the tool.

23 Claims, 3 Drawing Sheets

PRIOR ART

SUPPORT ARRANGEMENT

This invention is to a support arrangement and more particularly to a support assembly intended for use to support an upstanding planting such as a small tree.

BACKGROUND

The present disclosure is directed to an improvement over the Support Apparatus described and claimed in my U.S. Pat. No. 6,612,071 issued Sep. 2, 2003. While the support of the patent is a definite improvement over prior planting supports, there nonetheless are occasions when it is difficult to sufficiently tighten the mounting band to prevent slippage under all conditions.

SUMMARY OF THE DISCLOSURE

With the preferred embodiment a bracket including an arcuately curved main part for engaging a planting such as a small tree. A pair of bands are provided. Each band has an anchored end connected to the main part. A pair of housings are connected to the main part. The housings define passages respectively to receive free ends of the bands. The housings have projections which are tapered toward the respective anchored ends. The projections project through apertures in the bands to secure the bands in tightened loops.

One of the outstanding features of the support is that the bands may tightened with a simple pin like tool. Indeed a piece of rod small enough to extend through the band apertures is all that is required to effect band tightening. In the preferred arrangement the rod is notched to prevent band slippage along the rod as a band is tightened and an operator handle is provided.

Accordingly the objects of the invention are to provide a novel and improved support arrangement and a process of supporting a young planting.

DRAWING DESCRIPTION

FIG. 1 is a diagrammatic side view of a support disclosed and claimed in U.S. Pat. No. 6,617,071;

FIG. 4 is a diagrammatic side view of part of a tool usable with the arrangement of FIG. 2;

PREFERRED EMBODIMENT

Figure 1:
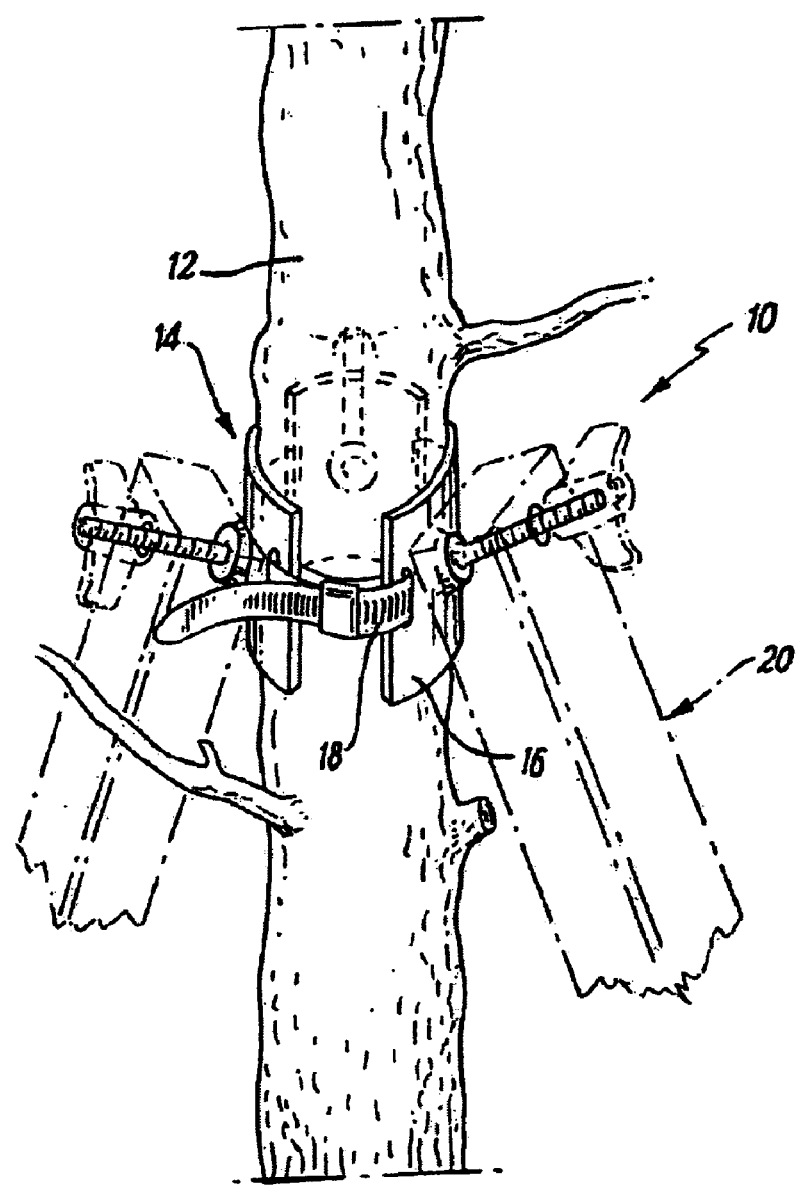

FIG. 1 shows my prior support apparatus 10 for supporting a tree 12 as described and claimed in my patent 6,612.071. The apparatus 10 includes a mounting part 14 in the form of three identical brackets 16 which are mounted around the tree 12 by three ties 18. Ground engaging rigid elongate members 20 are respectively connected to each bracket 16 to provide support. In practice it has been found relatively difficult to tighten the ties 18 or other arrangements which may have been used, and in practice it has often been necessary to use a band tightener.

FIG. 2–5 show a support arrangement 22 according to the present invention. The arrangement 22 comprises a bracket 24 and a pair of elongate members 26 in the form of bands 28 each with a plurality of circular equispaced openings 30. Each of the two bands 28 extends from an anchored end 32 connected to the bracket. Each band extends in a loop, the whole of which is not shown, to a free end 34.

The bracket 24 has an arcuate main part 36 which can be located in use against a tree being supported. A first pair of tool openings 38 are provided towards one circumferential end of the part 36, with one opening 38 for each band 28. A pair of mounting openings 40 are provided each located a short distance from a respective one of the tool openings 38.

Figure 5:
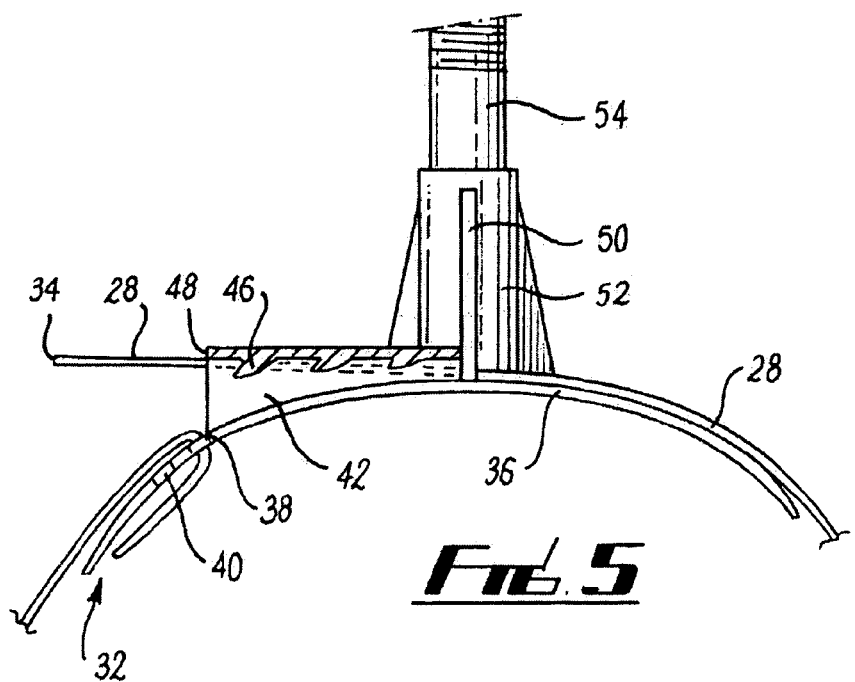
FIG. 5 is a diagrammatic side view of part of the arrangement of FIG. 2.

A pair of tangentially extending housings 42 are connected to the main part. Each housing 42 is adjacent an associated mounting opening 40 and is open ended to define substantially tangentially extending passages 44. Three projections 46 extend into each passage 44 from an upper housing wall 48. The projections 46 are inclined towards the left as shown in FIG. 5.

An outwardly extending radial web 50 is connected to the main part. The web increases in height towards the middle of the main part 36. The web 50 mounts an inclined threaded passage 52 which can locate a bolt 54 as shown.

The bracket 24 includes two pairs of cut out recesses 56 with a pair on each circumferential edge of the main part 36. The cut outs transversely locate the bands 28.

Figure 6:
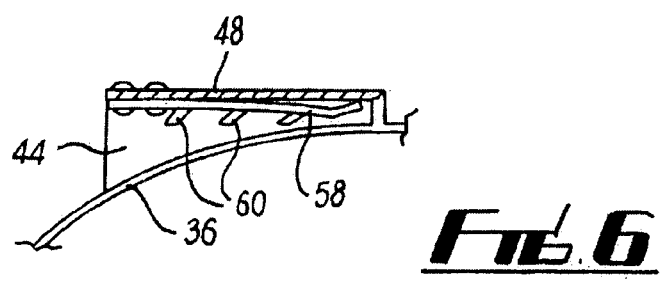
FIG. 6 is a diagrammatic side view of part of an alternative arrangement according to the invention.

FIG. 6 shows part of a similar arrangement except that the projections in the passage 44 are provided by a profiled strip 58 with inclined projections 60. Each strip 50 is fixed to the underside of the upper wall 48 as by rivets.

In use, the anchored end 32 of each of the bands 28 is folded about an edge of the respective mounting openings 42. The remainder of the bands 28 are formed into loops and the free ends 34 are passed through the passages 44. The projections 46 permit the loops to be tightened but normally do not permit them being loosened to increase the loops in size.

The loop sizes can be increased. First, the loops are tightened to disengage the projections 46 and then the band is held against the main part 36. As the band is held against the main part it may be fed in a loosening direction to expand the loop.

Figure 2:
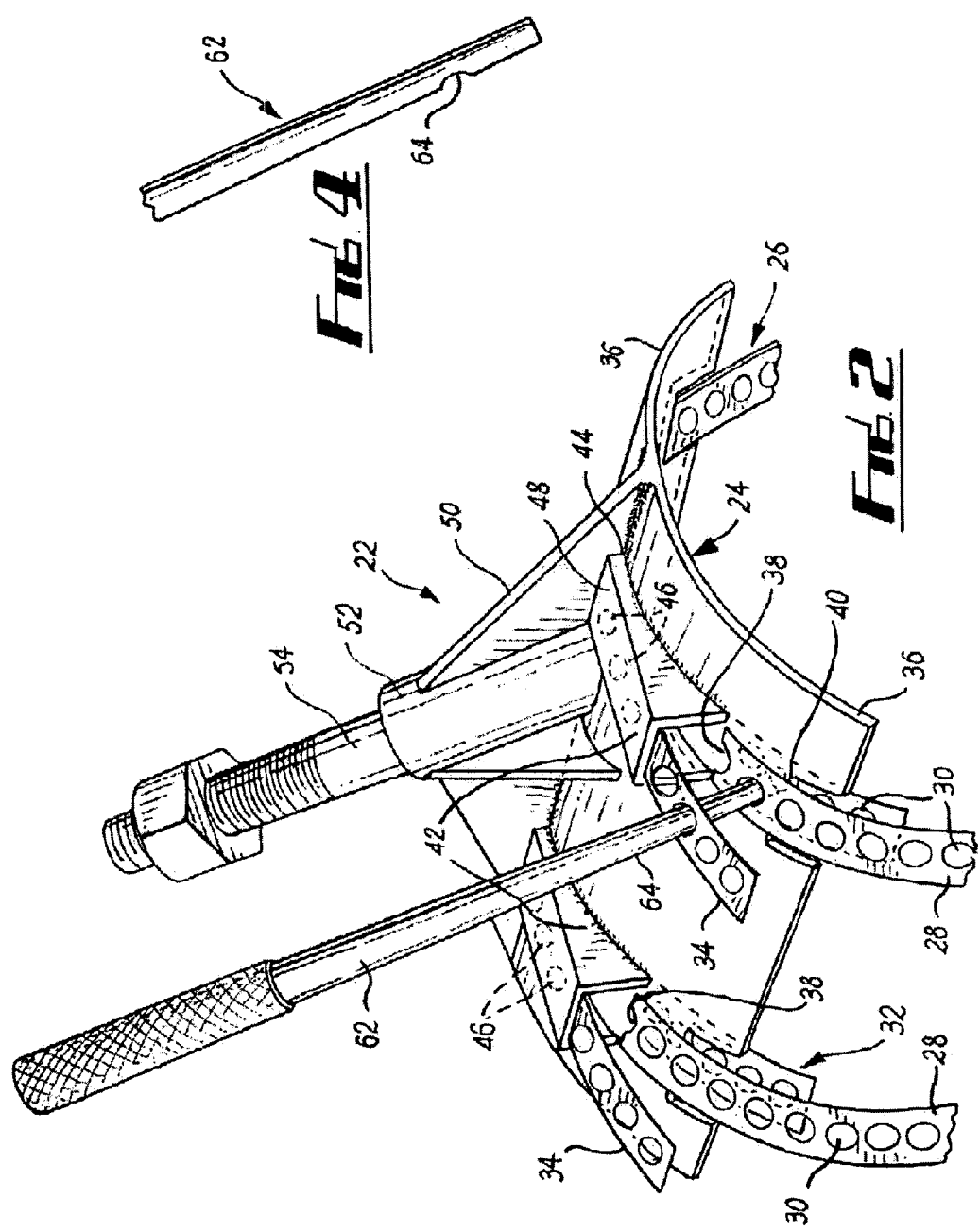
FIG. 2 is a diagrammatic perspective view of part of a support arrangement according to the invention.
Figure 3:
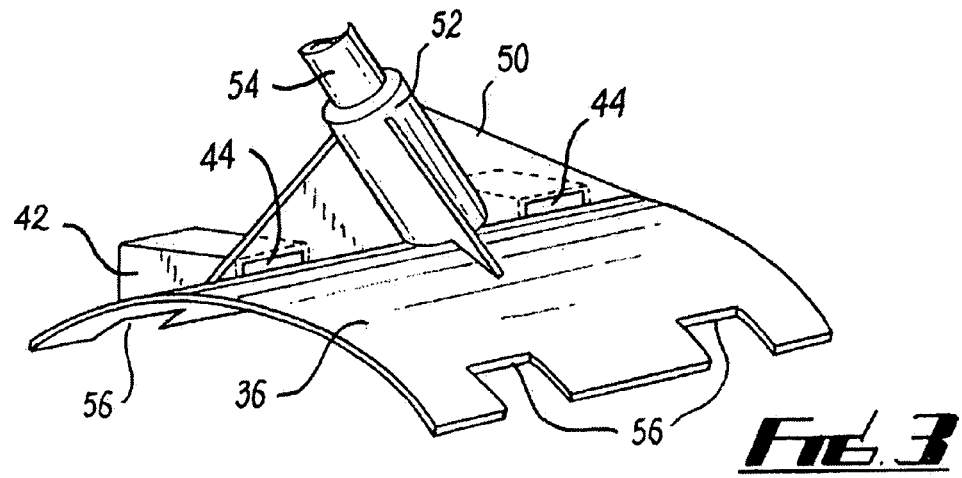
FIG. 3 is a diagrammatic perspective view of a bracket part of the arrangement of FIG. 2.

The loops can be tightened using an elongate tool 62 as shown in FIG. 2. The tool 62 is passed through one of the openings 30 towards the free end 34 of the respective band 28 which has passed through a passage 44. The tool 62 is then passed through two aligned openings 30 which are nearest the respective mounting opening 40. The tool 62 is then pushed through the respective tool opening 38, and if the bracket 24 is mounted against a tree the tool 62 may engage the tree.

The tool 62 can be moved in a lever action about the band opening 30 in the anchored end 32 to the left hand side as shown in FIG. 5. This causes tightening of the respective loop. The projections 46 normally prevent the band 38 moving back to the right as shown in FIG. 4 to increase the size of the loop. A notch 64 is provided in the tool 62 towards the proximal end thereof. The notch 64 is engagable with the band adjacent the penetrated opening 30 in the free end 34 to prevent the band 28 sliding along the tool 62.

In practice, the arrangement 20 may form part of an assembly similar to that shown in FIG. 1 with one or more further support brackets with openings therein to permit the band 28 to pass therethrough. The bolt 54 will permit rigid elongate members, such as the elongate members 30 of the referenced patent, to be mounted to provide ground engaging support. Similar mounting arrangements may be provided on the further brackets.

There is thus described a support arrangement, and a support assembly including such an arrangement which readily provides for tightening of a loop around for instance a tree by the use of a simple tool, thereby avoiding a requirement for band tighteners or other such implements. The arrangement is of relatively straightforward construction and can thus be inexpensively and robustly manufactured.

Various modifications may be made without departing from the scope of the invention. For instance, in some circumstances only a single band may be required. Different formations could be provided to prevent enlargement of the loops.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and scope of the invention as hereinafter claimed.

I claim:

1. A support assembly comprising:
    a) a bracket for engaging an item to be supported, the bracket including an engagement body contoured to generally conform to the shape of an item the assembly is intended to support:
    b) an elongate apertured band for connecting the bracket to an item to be supported, the band including an anchored end connected to the bracket;
    c) structure connected to the bracket, the structure including projections for extending into band apertures;
    d) the band having a free end portion for coaction with the projections to secure the bracket to an item after the band has been wrapped around the item; and,
    e) the projections being slanted such that when a projection is projecting into a band aperture it is engaged with the band to resist relative movement in a band loosening direction while permitting the band and housing to be readily moved relatively in a band tightening direction.

2. A tool for use with the assembly of claim 1 including a body for extending into a selected aperture in the free end portion and with another part of the assembly functioning as a fulcrum, coacting with said another part to lever the band in a tightening direction.

3. The assembly of claim 1 further including a second apertured band and the structure further including two sets of projections each for selective extension into apertures of a respective and associated one of the bands.

4. The assembly of claim 3 wherein the structure includes a spaced pair of housings and the projections are within the housings.

5. The assembly of claim 4 wherein the body is curved and the housings are tangential to the body.

6. The assembly of claim 5 wherein the body is curved and the housing is tangential to the body.

7. The assembly of claim 1 wherein the structure includes a housing and the projections are within the housing.

8. The assembly of claim 1 wherein a leg support projection extends from the body for connection of a support leg.

9. The assembly of claim 8 wherein a bolt is carried by the projection for extension through a leg aperture.

10. The assembly of claim 1 further including at least one additional bracket for engaging an item to be supported, the second bracket being coactable with the band to be retained in a supporting position on an item to be supported.

11. A support assembly for use with a planting comprising:
    a) a curved bracket for engagement with a peripheral portion of a planting;
    b) a pair of apertured bands for securing the bracket to a planting when the assembly is in use;
    c) the bracket including spaced pairs of band locating recesses respectively for receiving and locating the bands relative to one another and relative to the bracket;
    d) a spaced pair of tangential housings connected to the bracket each for receiving an associated one of the bands when the assembly is in use;
    e) each of the bands including an anchor end secured to the bracket when the assembly is in use;
    f) each of the bands also including a free end to enable wrapping of the bands around a planting and insertion the free ends into respective and associated ones of the housings;
    g) each of the housings having a plurality of projections positioned to extend into band apertures in band retaining coaction; and,
    h) a leg support secured to the bracket and constructed to be connect to a leg in plant supporting relationship.

12. The assembly of claim 11 wherein the leg support is adapted to receive a rod having a threaded end portion, the end portion being for receipt of a leg retaining fastener.

13. The assembly of claim 12 wherein the rod is a bolt.

14. The assembly of claim 11 wherein a web is connected to the leg support and the bracket to reinforce their securement.

15. In combination with the assembly of claim 11 a tool for insertion into a band aperture in a free end portion of one of the bands and another aperture in the same band near the anchor end for tightening the same band about a planting by using walls defining said another aperture as a fulcrum for the tool to be used as a second class lever.

16. A support arrangement, the arrangement comprising
    a) a bracket and a connected elongate member which can be bent to form a loop extending from and returning to the bracket;
    b) one end of the elongate member being attached to the bracket and the other end of the elongate member extending through a tightening opening in the bracket to close the loop;
    c) the bracket and member being constructed such that said other end can be moved through the opening to tighten the loop but will automatically be restrained to substantially prevent movement the other way to increase the size of the loop; and
    d) the member having a plurality of openings such that the loop can be tightened by passing an elongate tool through an opening in the member towards said other end of the member, and moving the member relative to the bracket by a levering action of the elongate tool.

17. An assembly according to claim 16 in which a rigid ground engaging elongate support member is provided and selectively mountable thereto to permit the support assembly to support an upstanding item.

18. An arrangement according to claim 16, in which the arrangement is configured such that the elongate tool can pass through a second opening in the member towards said one end thereof after passing through the first opening, such tat the elongate tool can be pivotally moved relative to the second opening.

19. An arrangement according to claim 18, in which the arrangement is configured such that the elongate tool can pass through a tool opening in the bracket after passing through the second opening in the member.

20. An arrangement according to claim 16 in which the bracket has a generally arcuate configuration, and is arranged such that the member extends from said one end in a generally circumferential alignment, while the other end extends in a generally tangential alignment.

21. An arrangement according to claim 16, in which a mounting structure is provided on the bracket to permit items to be mounted thereto.

22. An arrangement according to claim 21, in which the structure comprises a threaded passage.

23. An arrangement according to claim 16, in which a formation is provided on the elongate tool to prevent the same sliding through the elongate member when causing movement thereon.

* * * * *